UNITED STATES PATENT OFFICE.

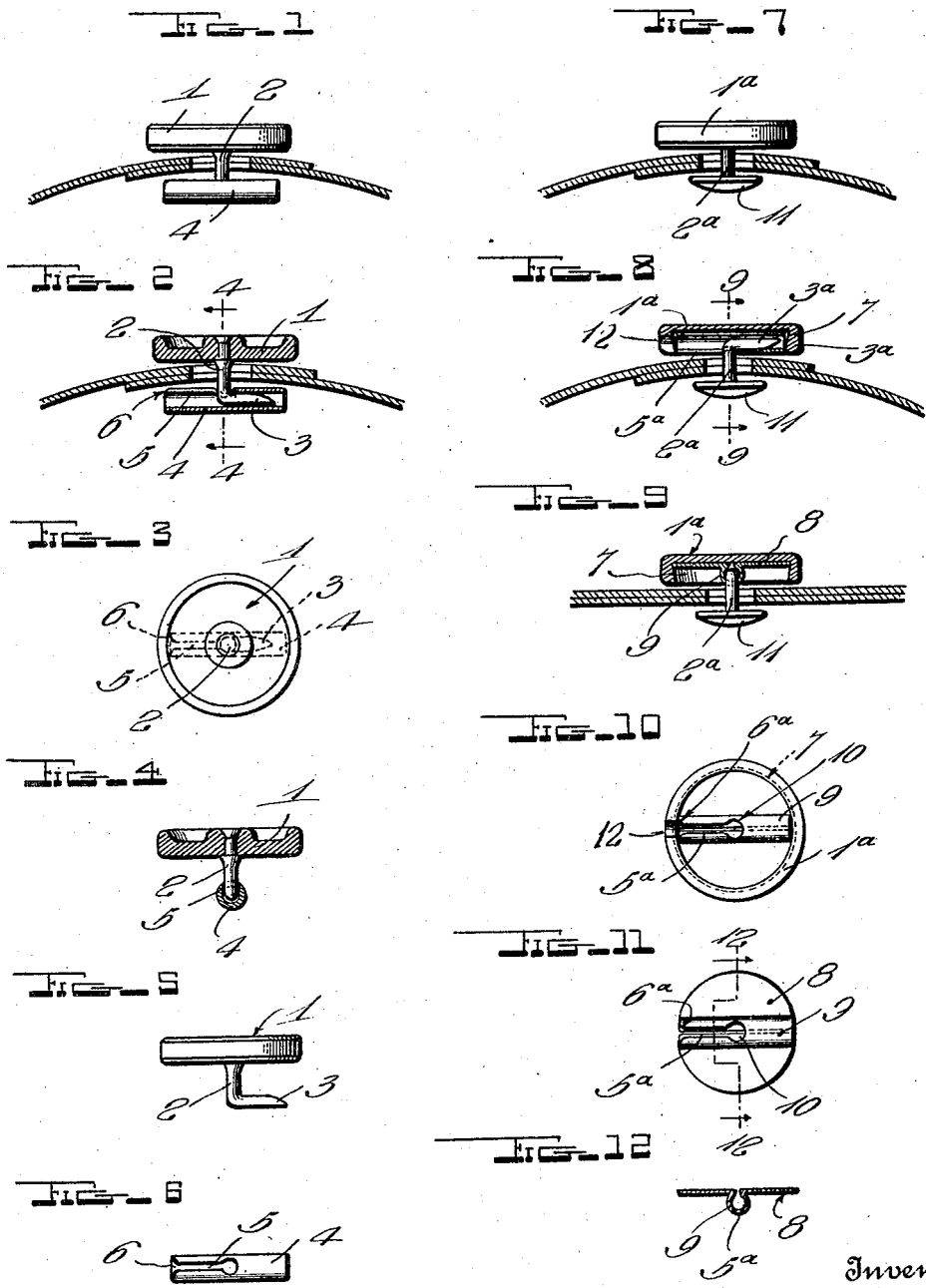

JOHN F. BECKER, OF TOLEDO, OHIO.

SEPARABLE FASTENER.

1,419,104.　　　　Specification of Letters Patent.　　Patented June 6, 1922.

Application filed July 21, 1921.　Serial No. 486,547.

*To all whom it may concern:*

Be it known that I, JOHN F. BECKER, a citizen of the United States, residing at Toledo, in the county of Lucas and State of Ohio, have invented certain new and useful Improvements in Separable Fasteners; and I do declare the following to be a full, clear, and exact description of the invention, such as will enable others skilled in the art to which it appertains to make and use the same.

This invention relates to an improved separable fastener which is especially, although not necessarily, designed for connecting the free ends of soft cuffs together, being, of course, adaptable for various other uses on garments.

The principal object of the invention is to generally improve upon fasteners of this class by the provision of one of extreme simplicity and durability which is novel, the construction being such that the separable members are not liable to become accidentally disconnected when in use.

Another object of the invention is to provide a fastener of this class wherein the parts are not movable with respect to each other after the device is in position in the button-holes of the cuffs.

Other features and advantages of the invention will become apparent during the course of the following description:

In the accompanying drawings forming a part of this specification and in which like numerals are employed to designate like parts throughout the same:

Figure 1 is a side elevational view of a fastener constructed in accordance with the invention showing the same attached to a cuff.

Figure 2 is a central vertical sectional view through the fastener.

Figure 3 is a top plan view thereof.

Figure 4 is a sectional view taken substantially on the plane of the line 4—4 of Fig. 2.

Figures 5 and 6 are elevational views of the details of the device disconnected.

Figure 7 is an elevational view of a slightly modified form of fastener.

Figure 8 is a combined sectional and elevational view of this form of fastener.

Figure 9 is a section taken substantially on the plane of the line 9—9 of Fig. 8.

Figure 10 is a bottom plan view of one of the members of the fastener with the retaining disk connected thereto.

Figure 11 is a bottom plan view of said retaining disk.

Figure 12 is a sectional view taken on the line 12—12 of Fig. 11.

Referring to Figs. 1 to 6 inclusive disclosing one of the forms of the invention, it will be seen that the numeral 1 designates a button of suitable shape and design which is equipped with a fixed angular shank 2, the laterally directed portion of which has its free end pointed as indicated at 3 to serve a purpose to be later described. The fastener, in addition to embodying these parts, includes a substantially tubular metallic retainer 4 which has a key-hole slot 5 formed therein and opening through one end thereof. The last named end of the slot is slightly enlarged as indicated at 6 to facilitate insertion of the shank and the restricted portion is of such a width as to prevent accidental slippage of retainer 4 off of the shank when the fastener is in position in the button-holes of the cuff or attached to a garment.

In use, the button-holes of the cuff are registered in the usual way and the shank 2 of the fastener is passed through these holes. Now, by placing the fingers inside of the cuff the retainer 4 can be slid, by means of the aforesaid slot 5 onto the shank 2. It is obvious that the retainer is forced sufficiently far onto the shank to cause the latter to become seated in the enlarged inner end of the slot as indicated in Fig. 2.

It may be stated here, that the pointed end 3 of the laterally directed portion of the shank, together with the enlarged entrance of the slot, facilitates engagement of the retainer with the shank.

Referring to the preferred and slightly modified form of the invention, which is nothing more than a reversal of the form described, it will be seen that 1ª designates a button of similar design to the one described, the same being formed in its inner face with a recess, the walls of which are undercut as indicated at 7 to provide a shoulder. In this recess, a metallic disk 8 is seated and this disk includes an integral tubular spring 9 which is the equivalent of the aforesaid retainer 4, the same having the additional function of forcing the peripheral portion of the disk beneath the aforesaid shoulder so as to retain the disk in position in the recess in the button 1ª. The part 9 is formed with a key-hole slot 5ª with an enlarged entrance 6ª and an enlarged inner end 10 which slot serves in the same way as the one already described. The form of the invention now under consideration in addition to embodying the parts so far described, includes what may be termed a button 11, and this part is equipped with an angular shank 2ª having a pointed free end 3ª. It is obvious that this shank in this form of the invention is likewise adapted to be passed through the slot 5ª in the retainer 9 so that it can be seated in the enlarged inner end of the slot to temporarily prevent separation of the buttons and retaining latter in position on the garment. As before indicated, this form of the invention is quite similar to the form first described and practically the same result is accomplished by simply reversing the parts and adding small details. However, in the last form of the invention, one of the features of novelty which calls for special emphasis is the disk 8 which is provided with an integral tubular part 9 which has the function of enabling the shank of the button 11 to be connected with the retaining button, and also through its inherent resiliency, serves to force the peripheral portion of the disk outwardly beneath the aforesaid shoulder provided by undercutting the wall of the recess in the inner face of the button 1ª. It is yet to be pointed out that the button 1ª in addition to being formed with the recess has its flange portion equipped with a notch 12 which communicates with this recess and with which the upper shank of the tubular retainer is registered in order to permit the shank to be connected with this retainer. Since the disk does not fit snugly in the recess, it is possible to grasp the portion 9 and rotate the disk in such a way as to move the entrance portion 6ª away from the notch and in this way prevent possible disconnection of the parts of the fastener.

The construction and arrangement of my improved fasteners is so simple, and the manner of using them is very plain, and in view of this, a more lengthy and detailed description is hardly necessary. Therefore, it is only desirable to further add that although the forms of the invention herein shown and described are taken as the preferred way of acomplishing the desired ends, it is to be understood that slight minor changes coming within the scope of the subjoined claims may be resorted to if desired.

I claim:

1. A separable fastener, comprising a head provided with a shank having a laterally directed free end, and a substantially tubular resilient retainer for said head having a restricted slot formed therein and opening through one end, said slot being enlarged at its inner end and the aforesaid shank being designed to be forced through the open end of the slot to position it in the enlarged portion with the laterally directed free end of the shank disposed beneath the unslotted portion of the tube to prevent relative rotation of the parts, yet permitting quick separation.

2. A separable fastener comprising a button having a recess in its underface, the wall of which is undercut, a resilient metal disk seated in said recess, said disk having an integral centrally slotted tubular portion constituting a retainer, and a second button having an angular shank designed to have its free lateral end arranged in said tubular retainer by passing said shank through the slot in said retainer.

3. A separable fastener comprising a button having a recessed inner face with the wall undercut and also formed with a notch opening into said recess, a metal disk seated in the latter, said disk including a centrally disposed tubular spring for forcing the peripheral edge beneath the shoulder formed by said undercut, said spring being formed with a slot enlarged at its ends, and a second button having an angular shank, designed to extend through said slot and be thus connected with said spring.

4. A separable fastener including a metal disk adapted to be seated in a recess formed in the bottom of a button or the like, said disk including a centrally disposed tubular spring for forcing its peripheral edge into engagement with the wall of the recess, and said spring being formed with a slot opening through one end, said slot being enlarged at its inner end and serving to accommodate the shank of a cooperating button or fastener.

In testimony whereof I have hereunto set my hand.

JOHN F. BECKER.